United States Patent Office.

CHARLES MOTIER NES, OF YORK, PENNSYLVANIA.

Letters Patent No. 109,752, dated November 29, 1870.

IMPROVEMENT IN THE MANUFACTURE OF IRON AND STEEL.

The Schedule referred to in these Letters Patent and making part of the same.

*To whom it may concern:*

Be it known that I, CHARLES MOTIER NES, of York, in the county of York and State of Pennsylvania, have invented new and useful Improvements in the Manufacture of Iron and Steel, of which the following is a specification.

The nature of my invention consists in the use, in the manner hereinafter described, of a peculiar ore, in combination with pig or cast-iron, for the purification of the iron or the manufacture of steel.

The ore is a siliceous magnetic iron-ore, having highly magnetic properties.

It, in general, has a decidedly granulated appearance, and in the main is composed of free silica and the magnetic silicide of iron.

The ore is obtained in Heidelburg township, York county, Pennsylvania, in a place known as "Nes' Hill," but may be found in other places.

By the use of this ore, either in a washed or unwashed condition, I am enabled to purify iron, or to manufacture steel, cheaply and expeditiously, while the metal is of a better quality than it has been heretofore practicable to produce.

In order to purify iron I take pig or cast-iron, mix with it from five to fifteen per cent. of the ore, then boil the same in the usual way.

The ore serves to purify the metal in a very short time. It removes the impurities, especially the sulphur and phosphorus, which have a decided affinity for the silica, and are found with the silex in the cinder or slag.

The ore is also effective in renewing "burnt-out" iron, such as old gas-retorts, coal-grates, &c., as it restores the qualities in which such metal is deficient. The process in this case is substantially the same as that above described for the purification of pig-iron.

In order to make wrought or cast-steel, I use from eighteen to thirty pounds of the ore to one hundred pounds of pig or cast-iron.

In making wrought-steel in a reverberatory or puddling-furnace I proceed as follows:

I first fettle the furnace with Port Henry ore, or with the fettling lately patented by me, or with other suitable fettling.

I then charge with five hundred pounds of pig or cast-iron, mixed with ore in the proportions above stated.

When a high grade of steel is required, such, for instance, as is suitable for making cold-chisels, a greater per cent. of ore is used; when a low grade is required less ore is needed.

The ore and pig are then melted and boiled together, and when the metal is granulating or coming to nature the furnace-damper is closed, and the metal is balled up and brought to the hammer.

Steel can thus be produced in from thirty-five minutes to one hour, depending upon the heat of the furnace.

The steel can also be made in a "run-out" or refinery, such as ordinarily used at forges, using about the proportions of ore above stated, and proceeding in the manner usual in making iron or steel with such apparatuses.

But, as in these furnaces as well as in the cupola and converter, mentioned below, the metal is subjected to a blast, which, in itself, tends to purify the metal, the proportion of ore may be less than eighteen per cent., if desired.

I make cast-steel by boiling the pig and ore (mixed in the proportions above stated) in a cupola or other suitable furnace until they are about to come to nature, and then tap out the molten metal and run it into molds of any shape desired.

Steel may also, in like manner, be made from the ore and pig in a converter.

I attribute the steel-making properties of the ore to the silicon it contains in combination with the peculiar magnetic quality of the ore. When the metal is in a state of fusion a portion of the ore is converted into silicon, which becomes incorporated with the molten metal, displacing the carbon, and forming what may be termed "silicon steel." The silicon imparts to the steel qualities which ordinary "carbon steel" does not possess. It gives it increased malleability, tensile strength of material, and greater hardness on tempering; and the steel is capable of sustaining a higher heat, and possesses better welding properties. In a word, in the steel silicon takes the place of carbon, and the result is the production of a superior steel, whether wrought or cast. And the use of the ore is productive of the further advantage of economy and ease of manufacture, as the steel may be made at about the same cost as that which now attends the manufacture of ordinary castings.

The purified cast-iron and restored burnt-out iron, above mentioned, becomes "steel pig" by the action of the ore, and may, without further addition of ore, be converted into cast or wrought-steel in the usual way.

The pig can thus be manufactured at the mine, and can thence be transported or shipped to any point where it is desired to work it up into steel, thus avoiding necessity of shipping the crude ore.

Having now described my invention, and the manner in which the same is or may be carried into effect, I would say that I do not limit myself to any special form of apparatus; but

What I claim, and desire to secure by Letters Patent, is—

1. The manufacture of wrought or cast-steel in a cupola, refinery, puddling, or other suitable furnace, by the use of the ore herein specified, in combination with pig or cast-iron, substantially as described.

2. The ore herein specified, for purifying cast-iron and restoring the qualities deficient in burnt-out iron, fitting them to be used as steel pig for the manufacture of steel therefrom, substantially in the manner set forth.

In testimony whereof, I have signed my name to this specification before two subscribing witnesses.

CHAS. M. NES.

Witnesses:
M. BAILEY,
EDM. F. BROWN.